H. H. KELTY.
Gate.

No. 66,501.

Patented July 9, 1867.

Witnesses:
J. H. Burridge
Frank Alden

Inventor:
Henry H. Kelty

United States Patent Office.

HENRY H. KELTY, OF NORTHFIELD, OHIO.

Letters Patent No. 66,501, dated July 9, 1867.

---

FARM-GATE.

---

The Schedule referred to in these Letters Patent and making part of the same.

---

TO ALL WHOM IT MAY CONCERN:

Be it known that I, H. H. KELTY, of Northfield, in the county of Summit, and State of Ohio, have invented certain new and useful improvements in Farm Gates; and I do hereby declare that the following is a full and complete description of the same, reference being had to the accompanying drawings, in which—

Like letters of reference refer to like parts in the different views.

Figure 1:
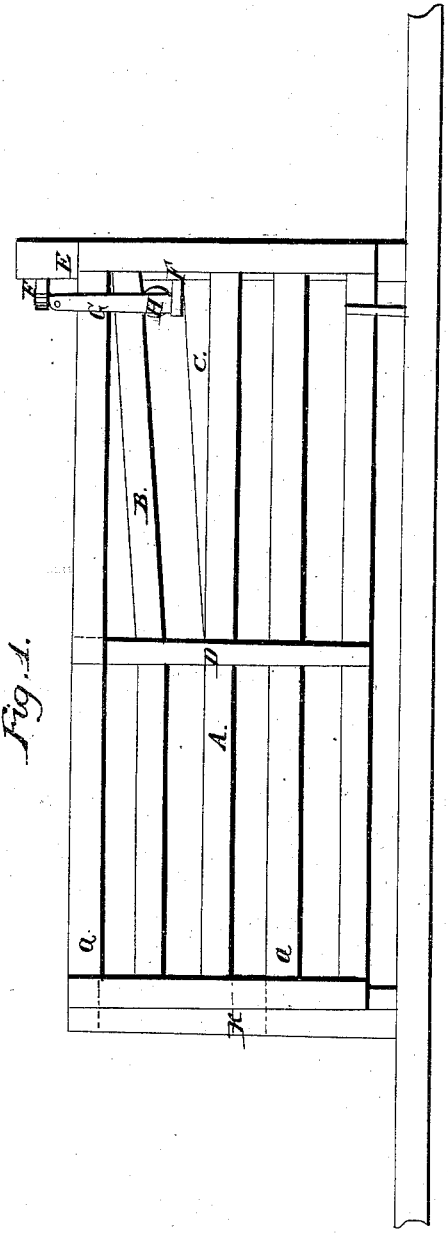
Figure 1 is a view of the gate when shut.
Figure 2:
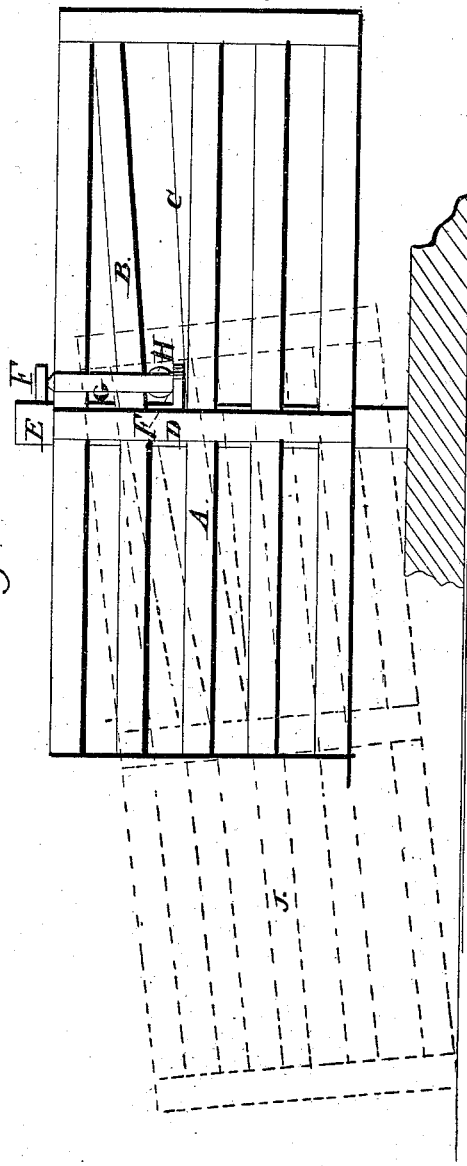
Figure 2 is a view of the same when open.

A represents the gate, which is constructed in the ordinary manner, with the exception that the bars B C are secured in an inclined position, forming an inclined plane from the centre bar D back to the post, as shown in the drawing. E is a post, from which project the arms F, in which is pivoted the slotted stay G. At the longer end of this slot is a roller, H, on which the bar B rests and slides as the gate is opened, which is done as follows: The gate is pushed back upon the roller to the middle bar D, and as it moves backward it is raised upward at the same time by the inclined bar B, and is thereby lifted above any obstruction, as snow drifts, &c. The gate, when thus rolled back to the bar D, is equally balanced, and can be easily swung around on the pivoted stay in line with the carriage-way. The gate may remain in this position, or it may be dropped down as indicated by the dotted lines J, fig. 2, and thereby relieve the stay and post from its whole weight. The manner of shutting the gate will readily suggest itself, and when closed is supported on the post K by the projecting ends of the bars a, which will support the gate and prevent its sagging.

What I claim as my improvement, and desire to secure by Letters Patent, is—

The gate A, constructed with inclined bars B C, in combination with the slotted stay C, as and for the purpose herein substantially as described.

HENRY H. KELTY.

Witnesses:
W. H. BURRIDGE,
E. E. WAITE.